US008167250B2

(12) United States Patent
White

(10) Patent No.: US 8,167,250 B2
(45) Date of Patent: May 1, 2012

(54) ADJUSTABLE CABLE TRAY JOINT

(75) Inventor: Thomas C. White, Greenville, SC (US)

(73) Assignee: James C. White Company, Inc., Greenville, SC (US)

(*) Notice: Subject to any disclaimer, the term of this patent is extended or adjusted under 35 U.S.C. 154(b) by 714 days.

(21) Appl. No.: 11/863,749

(22) Filed: Sep. 28, 2007

(65) Prior Publication Data
US 2009/0084910 A1 Apr. 2, 2009

(51) Int. Cl.
F16L 3/00 (2006.01)

(52) U.S. Cl. ............... 248/49; 248/291.1; 248/292.14; 248/299.1; 248/68.1; 403/61; 403/98

(58) Field of Classification Search .............. 248/49, 248/274.1, 291.1, 292.14, 299.1, 68.1; 403/61, 403/98
See application file for complete search history.

(56) References Cited

U.S. PATENT DOCUMENTS

| 689,894 | A | * | 12/1901 | Lutz | 285/184 |
|---|---|---|---|---|---|
| 1,940,169 | A | * | 12/1933 | Hinton | 172/372 |
| 3,053,358 | A | * | 9/1962 | Gross | 52/696 |
| 3,137,468 | A | | 6/1964 | Meinders | |
| 3,618,882 | A | * | 11/1971 | Podedworny | 248/68.1 |
| 3,759,035 | A | * | 9/1973 | Schmidberger | 59/78.1 |
| 4,232,845 | A | * | 11/1980 | Turner | 248/49 |
| 4,418,626 | A | * | 12/1983 | Semien | 108/8 |
| 4,432,519 | A | * | 2/1984 | Wright | 248/49 |
| 4,445,659 | A | * | 5/1984 | LaChance | 248/210 |
| 4,729,541 | A | * | 3/1988 | Maier | 249/18 |
| 4,882,807 | A | * | 11/1989 | Frye et al. | 16/225 |
| 4,949,925 | A | * | 8/1990 | Gorecki | 248/238 |
| 5,247,961 | A | * | 9/1993 | Micheau et al. | 137/355.16 |
| 5,335,349 | A | * | 8/1994 | Kutsch et al. | 375/257 |
| 5,465,929 | A | | 11/1995 | Dooley | |
| 5,634,614 | A | | 6/1997 | Rinderer | |
| 5,771,676 | A | * | 6/1998 | Komiya et al. | 59/78.1 |
| 6,070,742 | A | | 6/2000 | McAnally et al. | |
| 6,303,864 | B1 | | 10/2001 | Johnson et al. | |
| 6,349,534 | B1 | * | 2/2002 | Zanolla et al. | 59/78.1 |
| 6,460,812 | B1 | | 10/2002 | Jette | |
| 6,498,296 | B2 | * | 12/2002 | Benito-Navazo | 174/68.3 |
| 6,585,195 | B2 | * | 7/2003 | Wentworth et al. | 248/49 |
| 6,805,248 | B2 | | 10/2004 | Champion et al. | |
| 6,902,069 | B2 | | 6/2005 | Hartman et al. | |
| 6,992,254 | B2 | * | 1/2006 | Komiya | 174/138 B |
| 7,458,188 | B2 | * | 12/2008 | Mears | 52/300 |
| 2002/0158170 | A1 | * | 10/2002 | Wentworth et al. | 248/49 |
| 2003/0015627 | A1 | * | 1/2003 | Van Scoy et al. | 248/49 |
| 2005/0040295 | A1 | * | 2/2005 | Sinkoff | 248/58 |
| 2005/0086902 | A1 | * | 4/2005 | Mears | 52/749.1 |

* cited by examiner

Primary Examiner — Terrell McKinnon
Assistant Examiner — Michael McDuffie
(74) Attorney, Agent, or Firm — Turner Padget Graham & Laney

(57) ABSTRACT

An adjustable cable tray joint is provided. The joint has first and second tray receptacles, each having a web and opposing walls. The first tray receptacle may further include joint flanges extending from its walls. The first and second tray receptacles are attached together by pivotal connection, the receptacles defining a rotation relative to each other about the pivotal connection. The joint flanges of the first tray receptacle are disposed proximate to the corresponding walls of the second tray receptacle. The joint includes a locking member extending through a wall of the first tray receptacle and the corresponding wall of the second tray receptacle, the locking member configured to selectively fix and release the rotation between the two tray receptacles.

13 Claims, 11 Drawing Sheets

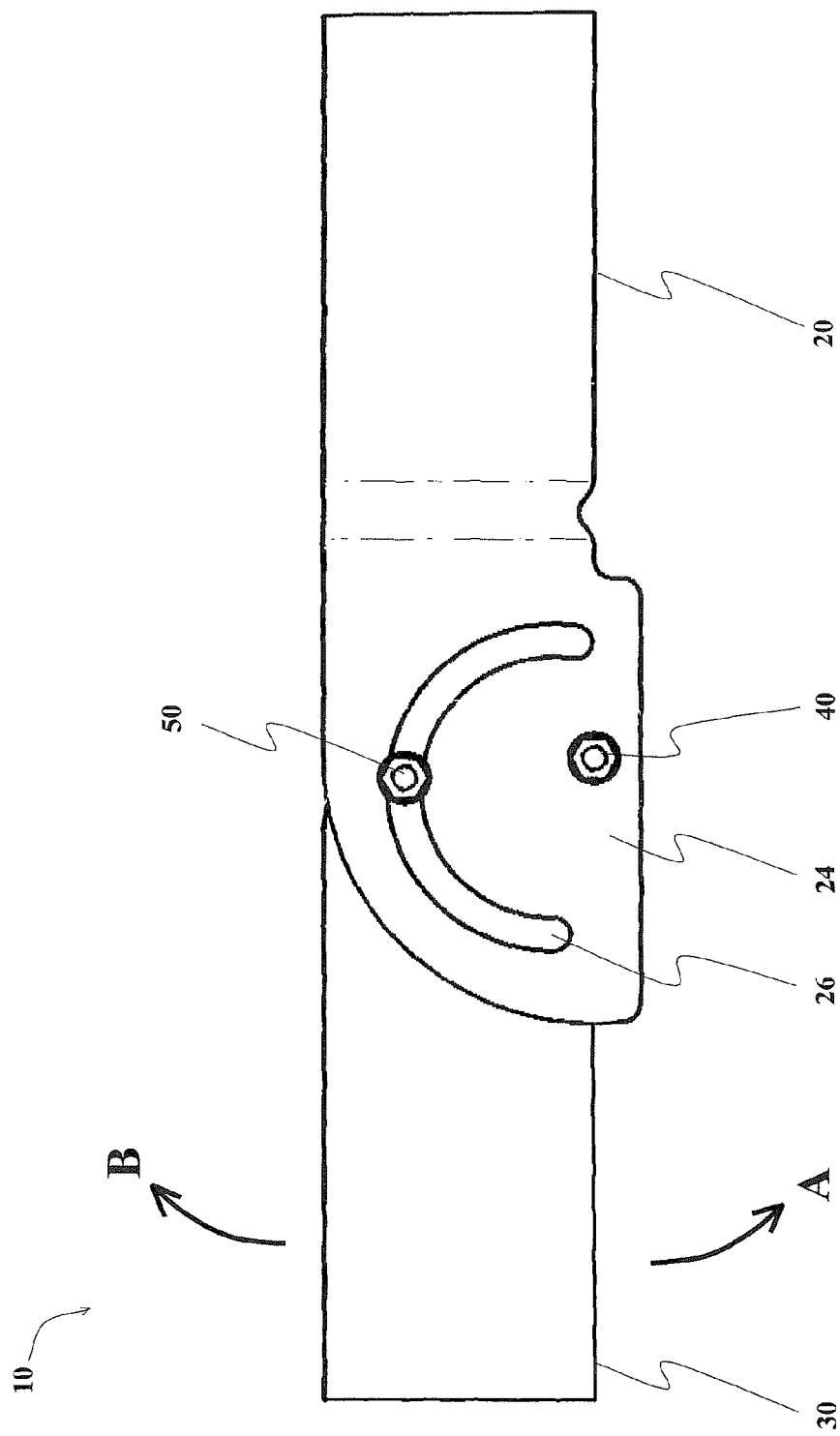

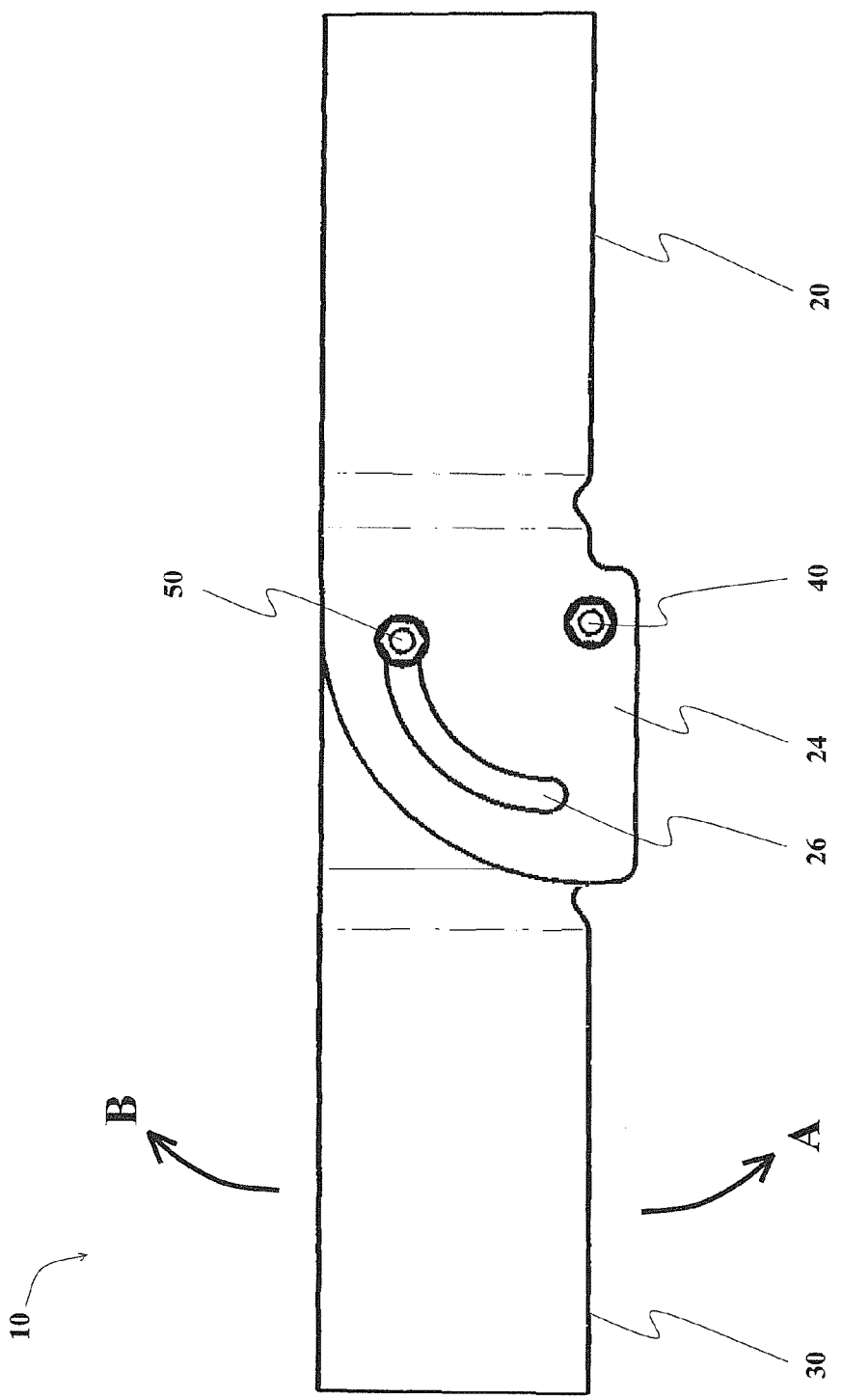

ADJUSTABLE CABLE TRAY JOINT

FIELD OF THE INVENTION

The presently disclosed technology relates to a connection member for cable tray systems. More particularly, the presently disclosed technology is directed to a cable tray joint that is adjustable to provide angular redirection of cable tray runs.

BACKGROUND OF THE INVENTION

Cable tray systems are structures that are used to support, fasten, and manage cables, tubes, conduit, and wires. Cable tray systems may be used in industry, power generation facilities, manufacturing plants, and the like, and elsewhere where such purposes exist. The cable trays used in these systems often have a U-shaped or an L-shaped cross-section, with the cables, tubes, conduits, and/or wires carried within the U-shape or L-shape. In many applications, it is required that a completed cable tray system have structural rigidity. In other applications, not only is structural rigidity required, but also the completed system must be such that electrical arcing between connected members of the system be avoided should the system become electrically energized.

Cable tray systems typically are constructed of linear runs of trays connected together to span the required length of a given application. Some applications allow for an entire cable tray run to reside in a single plane. However, in other applications, the installation of a run of cable tray may encounter previously-installed obstacles, such as pipes, conduit, or even other cable tray runs, residing in the same plane as the cable tray being installed. In such event, the new cable tray run must be redirected to avoid such an obstacle. In still different applications, for other sufficient reasons, it may be desirable to construct a cable tray system that transitions from one plane to another, even multiple times, along its length.

One prior method of accomplishing such redirection was to require the installer to cut, fit, and attach solid members to work around such an obstacle by deviating above or below it. Such work has been found to be labor intensive and time consuming, and undesirable.

Another method of redirecting a cable tray run is disclosed in U.S. Pat. No. 4,232,845, directed toward a modular support system constructed from a plurality of transportable modular components for assembly into shelves, platforms, ladders, walkways, and other similar structures. The disclosed apparatus provides for vertical displacement of a cable track. However, the apparatus accomplishes such displacement through the use of riser plates of fixed geometry. No pivoting between adjacent sections of a cable track is contemplated, and therefore no range of angular relationships between adjacent runs of cable track may be accomplished.

Yet another method of redirecting a cable tray run is disclosed in U.S. Pat. No. 3,137,468, which discloses a cable tray curve section. While the apparatus of this patent accomplishes a cable track with sections residing in different planes, this redirection is accomplished merely through use of a form section of cable track rather than a pivoting connector. No provision is made for pivoting between adjacent cable track members.

Finally, U.S. Pat. No. 4,432,519 describes a cable mounting ladder for installation to a building or other structure constructed so that curved sections can be interconnected to avoid obstructions in a horizontal plane. The apparatus accomplishes such avoidance, however, with the use of pre-configured, fixed geometry angled interconnectors between adjacent tray members, a labor-intensive, cumbersome system. Furthermore, this device provides for no pivoting between sections of a cable run.

In view of the many advantages of cable track system, and in recognition of the need to avoid interfering obstacles in constructing such a system, it would be desirable to provide a cable tray joint that is adjustable to provide angular redirection of a cable tray run.

SUMMARY OF THE INVENTION

A cable tray joint is provided that is adjustable to allow angular redirection of cable tray runs.

In accordance with certain aspects of certain embodiments of the present subject matter, the joint may include a first tray receptacle, the first tray receptacle having a first web, a first wall, and an opposing second wall. The first tray receptacle may further include first and second joint flanges, the first joint flange extending from the first wall, the second joint flange extending from the second wall. The first joint flange may define therethrough an aperture. Still further, a second tray receptacle may be provided, the second tray receptacle having a second web, a third wall, and an opposing fourth wall. The first and second tray receptacles are attached together by pivotal connection, such that the first and second tray receptacles define a rotation relative to each other. So connected, the first joint flange may be disposed proximate to the third wall and the second joint flange may be disposed proximate to the fourth wall. The joint may further include a locking member, the locking member extending through the aperture defined in the first wall and through the third wall, the locking member configured to selectively fix and release the rotation.

In accordance with additional aspects of other embodiments of the present subject matter, the aperture may be a slot. In certain embodiments, the slot may define indexing notches. In such certain embodiments, the locking member may be a shouldered bolt, the shouldered bolt sized to interfit within one of the indexing notches provided.

In accordance with still further aspects of other embodiments of the present subject matter, the first tray receptacle may further include a curb.

Still further, in certain other embodiments the locking member may be a bolt and a mating nut.

In accordance with yet still further aspects of other embodiments of the present subject matter, the second joint flange may define therethrough a slotted aperture and the adjustable cable tray joint further comprising a second locking bolt and a mating nut, the second locking bolt extending through the slotted aperture and through the fourth wall, the second locking bolt configured to selectively fix and release the rotation of the first and second tray receptacles relative to each other.

In accordance with other aspects of other embodiments of the present subject matter, the adjustable cable tray joint may include a first tray receptacle, the first tray receptacle having a first web, a first wall, and an opposing second wall. The first tray receptacle may further include first and second joint flanges, the first joint flange extending from the first wall, the second joint flange extending from the second wall. A second tray receptacle may likewise be provided, the second tray receptacle having a planar second web, a third wall, and an opposing fourth wall. The first and second tray receptacles may be attached together by pivotal connection, such that the first and second tray receptacles define a rotation relative to each other. In such configuration, the first joint flange may be disposed adjacent to the third wall and the second joint flange may be disposed adjacent to the fourth wall. A locking means for selectively fixing and releasing the rotation may be included.

In accordance with additional aspects of other embodiments of the present subject matter, the aperture may be a slot. In certain embodiments, the slot may define indexing notches. In such certain embodiments, the locking member may be a shouldered bolt, the shouldered bolt sized to interfit within one of the indexing notches provided.

Still further, in certain other embodiments the pivotal connection may include a rod extending between the third and fourth walls. The rod may be a solid bar, a hollow tube, a threaded member, a shouldered stud, or the like. The first and second tray receptacles may rotate relative to each other about the axis of the rod, or about a different axis.

In accordance with yet still further aspects of other embodiments of the present subject matter, the rotation between the first and second tray receptacles may define an arc having an angle of between about ninety degrees and about one hundred eighty degrees between the first web and the second web. Alternatively, or additionally, in other embodiments, the rotation between the first and second tray receptacles may define an arc having an angle of between about one hundred eighty degrees and about two hundred seventy degrees between the first web and the second web. Still further alternatively, or additionally, in other embodiments the rotation between the first and second tray receptacles may define an arc having an angle of between about ninety degrees and about two hundred seventy degrees between the first web and the second web.

In accordance with additional still further aspects of other embodiments of the present subject matter, the first and second webs may each reside in a plane, and the pivotal connection between the first and second tray receptacles may define an axis of rotation, the axis of rotation residing above the planes of the first and second webs.

In accordance with aspects of other embodiments of the present subject matter, the adjustable cable tray joint may have a first tray receptacle that has a planar first web, a first wall, and an opposing second wall, the first and second walls being perpendicular to the first web, the first and second walls disposed in a spaced apart configuration defining therebetween a width of predetermined measure configured to received therein a cable tray. The first tray receptacle may further include first and second joint flanges, the first and second joint flanges being perpendicular to the first web, the first joint flange extending from the first wall, the second joint flange extending from the second wall. Both the first and second joint flanges may each define therethrough a slotted aperture. The first tray receptacle may further include a curb. Additionally, a second tray receptacle may be provided, the second tray receptacle having a planar second web, a third wall, and an opposing fourth wall, the third and fourth walls being perpendicular to the second web, the third and fourth walls disposed in a spaced apart configuration defining therebetween a width of predetermined measure configured to received therein a cable tray. The second tray receptacle may further include third and fourth joint flanges, the third and fourth joint flanges being perpendicular to the first web, the third joint flange extending from the third wall, the fourth joint flange extending from the fourth wall. Still further, the second tray receptacle may include a curb. The first and second tray receptacles may be attached together by pivotal connection wherein the first and fourth walls reside in parallel planes and the second and third walls reside in parallel planes, the first and second tray receptacles defining a rotation relative to each other. So connected, the first joint flange may overlap the third joint flange and the second joint flange may overlap the fourth joint flange. The joint may further include a first locking member, the first locking member extending through the slotted aperture defined in the first wall and through the third wall, the locking member configured to selectively fix and release the rotation. Also a second locking member may be provided, the second locking member extending through the slotted aperture defined in the second wall and through the fourth wall, the locking member configured to selectively fix and release the rotation.

In accordance with additional aspects of other embodiments of the present subject matter, the slotted apertures may define indexing notches, and the first and second locking members may each be a shouldered bolt, the shouldered bolts sized to interfit within the indexing notches.

Still further, in certain other embodiments the pivotal connection may include a rod extending between the third and fourth walls.

In accordance with yet still further aspects of other embodiments of the present subject matter, the pivotal connection may define an axis of rotation, the axis of rotation residing above the plane of the first web.

In accordance with additional still further aspects of other embodiments of the present subject matter, the rotation between the first and second tray receptacles may define an arc having an angle of between about ninety degrees and about one hundred eighty degrees between the first web and the second web. Alternatively, or additionally, in other embodiments, the rotation between the first and second tray receptacles may define an arc having an angle of between about one hundred eighty and about two hundred seventy degrees between the first web and the second web. Still further alternatively, or additionally, in other embodiments, the rotation between the first and second tray receptacles may define an arc having an angle of between about ninety degrees and about two hundred seventy degrees between the first web and the second web.

In accordance with further aspects of other embodiments of the present subject matter, the third and fourth joint flanges may define therethrough third and fourth slotted apertures, respectively, the first locking member extending through the third slotted aperture and the second locking member extending through the fourth slotted aperture.

BRIEF DESCRIPTION OF THE DRAWINGS

A full and enabling disclosure of the present invention, including the best mode thereof, directed toward one of ordinary skill in the art, is set forth in the specification, which makes reference to the appended figures. It should be noted that the appended drawings are not necessarily to scale in all instances.

FIG. 3 is a side view of an adjustable cable tray joint in accordance with certain aspects of the present invention, the adjustable cable tray joint configured for combined adjustment;

FIG. 4A is a side view of an adjustable cable tray joint in accordance with certain aspects of the present invention, the adjustable cable tray joint configured for combined adjustment;

DETAILED DESCRIPTION

Figure 1:
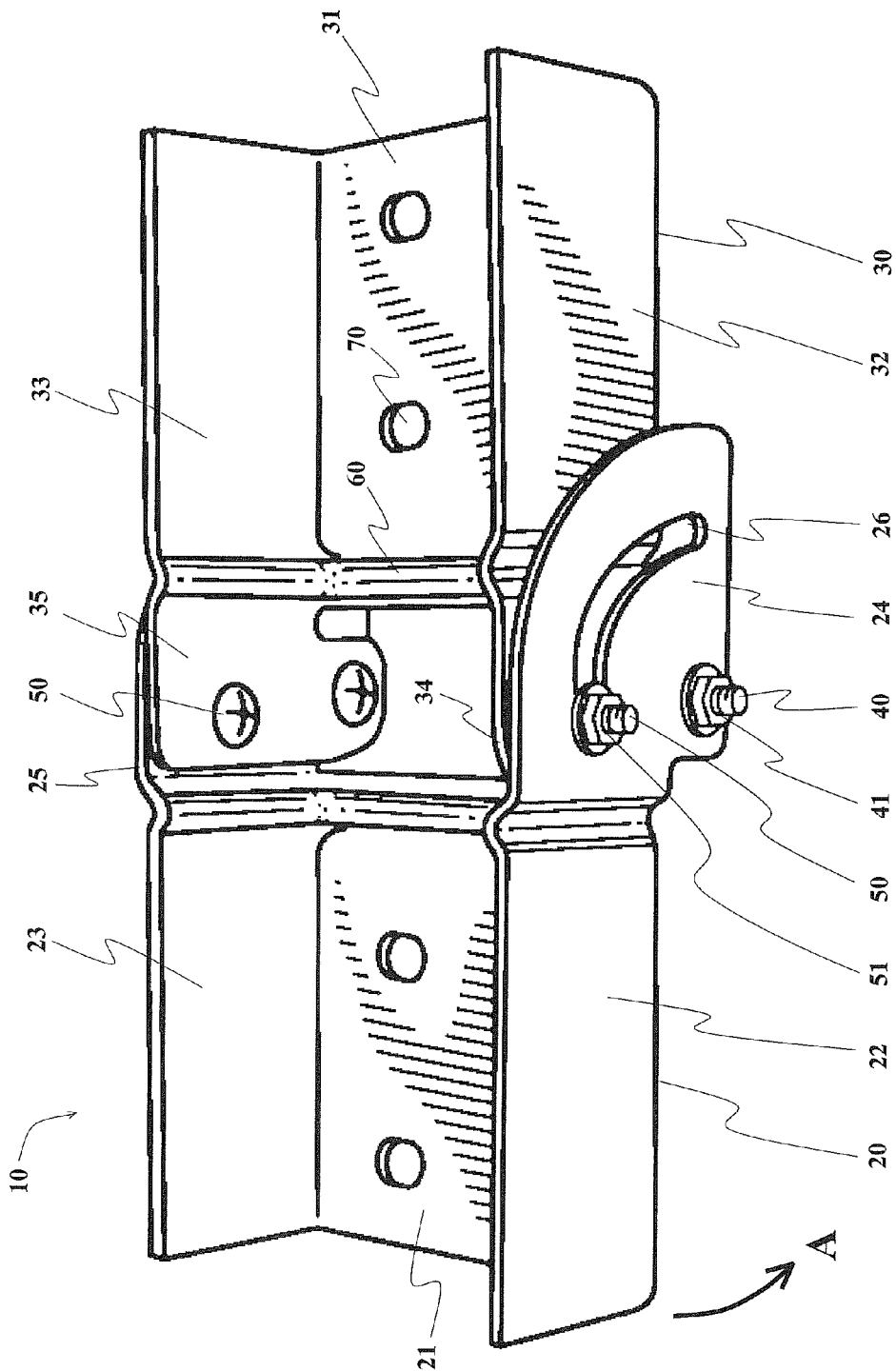
FIG. 1 is a perspective view of an adjustable cable tray joint in accordance with certain aspects of the present invention, the adjustable cable tray joint configured for open adjustment.

Reference will now be made in detail to presently preferred embodiments of the present subject matter, one or more examples of which are illustrated in the drawings. Each example is provided by way of explanation of the invention, and is not meant as a limitation of the invention. Features illustrated or described as part of one embodiment may be used on another embodiment to yield a further embodiment. It is intended that the present application includes such modifications and variations as come within the scope and spirit of the invention. Selected combinations or aspects of the disclosed subject matter correspond to a plurality of different embodiments of the present invention. Certain features may be interchanged with certain devices or features not expressly mentioned, which perform the same or similar function.

With reference to FIG. 1, an adjustable cable tray joint 10 includes a first tray receptacle 20 and a second tray receptacle 30. First tray receptacle 20 includes a first web 21, a first wall 22, and a second wall 23. Extending from first wall 22 is first joint flange 24, and extending from second wall 23 is second joint flange 25.

Likewise, second tray receptacle 30 includes a second web 31, a third wall 32, and a fourth wall 33. In the embodiment depicted in FIG. 1, second tray receptacle 30 further includes third joint flange 34 and fourth joint flange 35. In other embodiments, joint flanges are not provided with second tray receptacle 30.

Still with reference to FIG. 1, first joint flange 24 includes aperture 26; in the embodiment depicted in FIG. 1, aperture 26 is a radiused slot.

Figure 2:
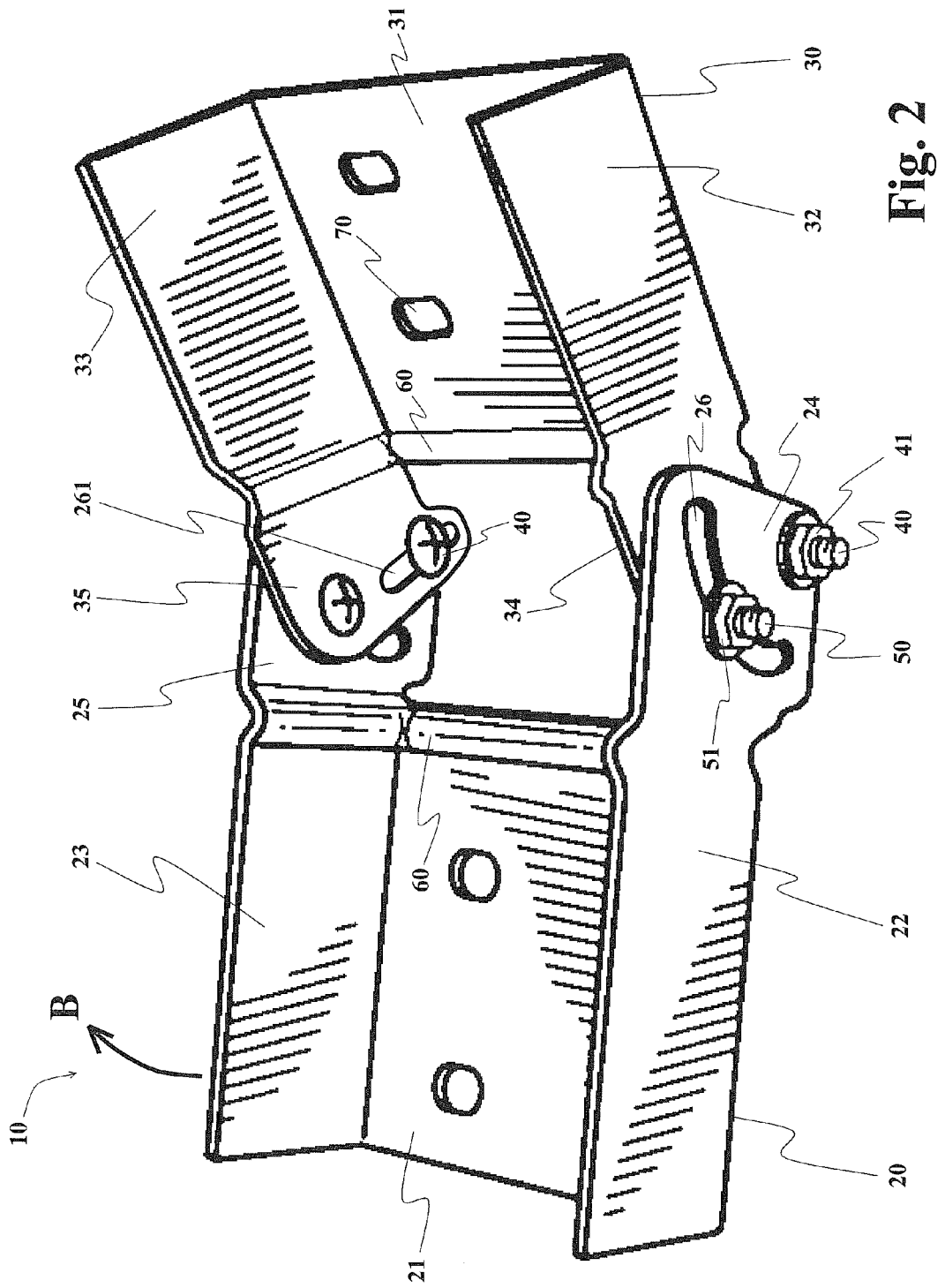
FIG. 2 is a perspective view of an adjustable cable tray joint in accordance with certain aspects of the present invention, the adjustable cable tray joint configured for closed adjustment.

First tray receptacle 20 and second tray receptacle 30 are connected by pivot bolts 40 extending through paired members first joint flange 24 and third joint flange 34, and second joint flange 25 and fourth joint flange 35. Pivot bolts 40 are secured with pivot nuts 41. In the embodiment depicted in FIG. 1, first tray receptacle 20 and second tray receptacle 30 may rotate relative to each about an axis formed by pivot bolts 40. In the embodiment depicted in FIG. 5, explained in more detail below, first tray receptacle 20 and second tray receptacle 30 may rotate relative to each about an axis formed by pivot rod 42. In other embodiments, however, the rotation of first tray receptacle 20 and second tray receptacle 30 relative to each other may not be about the axis formed by pivot bolts 40 or pivot rod 42. For example, in the embodiment depicted in FIG. 2, fourth joint flange 35 has been configured to include pivot slot 261; third joint flange 34 has been configured with a similar pivot slot, though it is not shown in FIG. 2. By disposing a pivot bolt 40 through pivot slot 261 in fourth joint flange 35 (and another pivot bolt 40 through the not-shown pivot slot in third joint flange 34) the rotation of first tray receptacle 20 and second tray receptacle 30 relative to each other may not be about the axis formed by pivot bolts 40. Instead, as first tray receptacle 20 and second tray receptacle 30 rotate relative to each other, locking bolt 50 may travel in aperture 26 in first joint flange 24 and pivot bolt 40 may travel in pivot slot 261. Use of the embodiment depicted in FIG. 2, including pivot slots 261, may provide for a more compact adjustable cable tray joint 10.

In certain embodiments, first joint flange 24 may be disposed proximate to third joint flange 34, and second joint flange 25 may be disposed proximate to fourth joint flange 35. First joint flange 24 may be disposed outboard of third joint flange 34 or inboard (not shown) of third joint flange 34; similarly, second joint flange 25 may be disposed outboard of fourth joint flange 35 or inboard (not shown) of fourth joint flange 35. In other embodiments, second tray receptacle 30 may not include joint flanges; in such embodiments, first joint flange 24 may be disposed proximate to third joint wall 32, and second joint flange 25 may be disposed proximate to fourth wall 33. First joint flange 24 may be disposed outboard of third wall 32 or inboard of third wall 32; similarly, second joint flange 25 may be disposed outboard of fourth wall 33 or inboard of fourth wall 33.

Adjustable cable tray joint 10 further includes locking bolts 50. One such locking bolt 50 extends through third joint flange 34 and through aperture 26; it is secured with locking nut 51. Another locking bolt 50 extends through fourth joint flange 35 and an aperture defined in second joint flange 25 (not shown), and is likewise secured with a locking bolt (not shown).

So connected, it may be appreciated that first tray receptacle 20 and second tray receptacle 30 may rotate relative to each other if locking bolts 50 and locking nuts 51 are loosened. Similarly, it may be appreciated that, by tightening locking bolts 50 and locking nuts 51, such rotation may be selectively fixed.

In certain applications, it may be found that, in fixing the rotation between first tray receptacle 20 and second tray receptacle 30, additional structural strength and rigidity may be achieved by also tightening pivot nuts 41.

Additional features of adjustable cable tray joint 10 shown in FIG. 1 include curb 60. As shown for example in FIG. 5, a tray receptacle (in the depicted instance, second tray receptacle 30) may be configured for receipt of a cable tray 80. End 81 of cable tray 80 may include a flesh saw cut, cable tray 80 having been sized on-site for a particular application, but such a fresh saw cut may be rough and thereby jeopardize the integrity or the insulation of wires, cables, and the like thereafter pulled through adjustable cable tray joint 10. However, the inclusion of curb 60 allows the end 81 of cable tray 80 to abut against the curb, and further allows wires, cables, and the like to ride not upon end 81 but instead upon curb 60, thereby preserving their integrity, insulation, or other desirable coatings or features.

It may be found in certain applications that the large area of contact between first joint flange 24 and third joint flange 34, and second joint flange 25 and fourth joint flange 35, along with the tightness of that contact achieved by the tightening of locking nuts 51, minimizes or eliminates the risk of electrical arcing between those respective members should a cable tray system using an adjustable cable tray joint 10 become electrically energized. It may also be found that the same advantageous result obtains in those other embodiments, in which second tray receptacle 30 includes no joint flanges, but instead the joint flanges 24, 25 of first tray receptacle 20 reside proximate to walls 32, 33 of second tray receptacle 30.

Still with reference to FIG. 1, fastener holes 70 may likewise be provided, for bolted attachment (with attachment bolts 71—see FIG. 5) of cable tray 80.

In the embodiment depicted in FIG. 1, it may be appreciated that rotation of first tray receptacle 20 and second tray receptacle 30 relative to each other is in the direction A, which may be defined as an "open" adjustability. Alternatively, in the embodiment depicted in FIG. 2, for example, it may be understood that such rotation is in the direction B, which may be defined as a "closed" adjustability. In certain embodiments, an open adjustability has been configured that provides for a rotation between first tray receptacle 20 and second tray receptacle 30 to define an arc having an angle of between about one hundred eighty degrees and about two hundred seventy degrees between first web 21 and second web 31. In certain other embodiments, such as that depicted in FIG. 2, a closed adjustability has been configured that provides for a rotation between first tray receptacle 20 and second tray receptacle 30 to define an arc having an angle of between about ninety degrees and about one hundred eighty degrees between first web 21 and second web 31.

In still further embodiments, a "combined" adjustability is provided. For example, as depicted in FIG. 3 an aperture 26 may be provided to allow for rotation of first tray receptacle 20 and second tray receptacle 30 relative to each other both in the direction A and in the direction B. So configured, the rotation between the first tray receptacle 20 and second tray receptacle 30 may define an arc having an angle of between about ninety degrees and about two hundred seventy degrees between first web 21 and the second web 31.

Figure 4B:
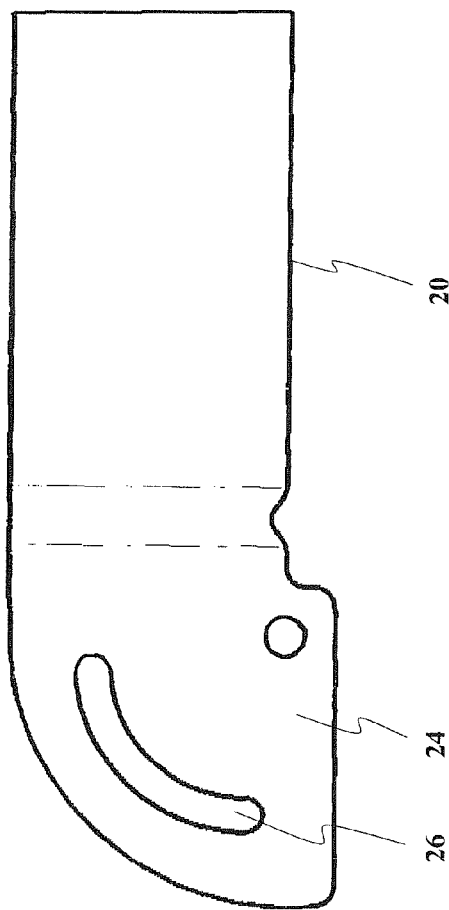
FIG. 4B is a side view of a first tray receptacle in accordance with certain aspects of the present invention.
Figure 4C:
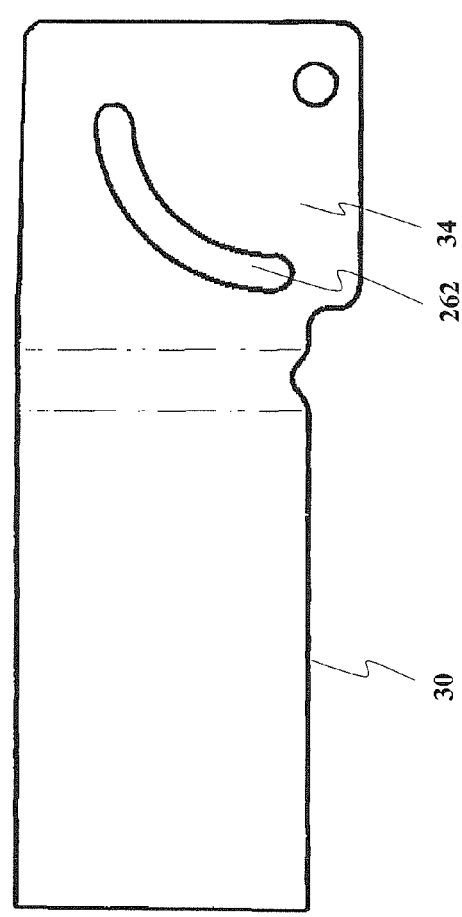
FIG. 4C is a side view of a second tray receptacle in accordance with certain aspects of the present invention.

Different embodiments likewise provide a "combined" adjustability. An example of such an embodiment is shown in FIG. 4A. The apparatus of FIG. 4A includes first tray receptacle 20 depicted in FIG. 4B and second tray receptacle 30 depicted in FIG. 4C. First joint flange 24 of first tray receptacle 20 includes therein aperture 26. Moreover, third joint flange 34 of second tray receptacle 30 (FIG. 4C) also includes therein an aperture 262. When first tray receptacle 20 is pivotally connected with second tray receptacle 30, aperture 26 and aperture 262 cooperate to allow a rotation between the first tray receptacle 20 and second tray receptacle 30 that defines an arc having an angle of between about ninety degrees and about two hundred seventy degrees between first web 21 and the second web 31.

Figure 5:
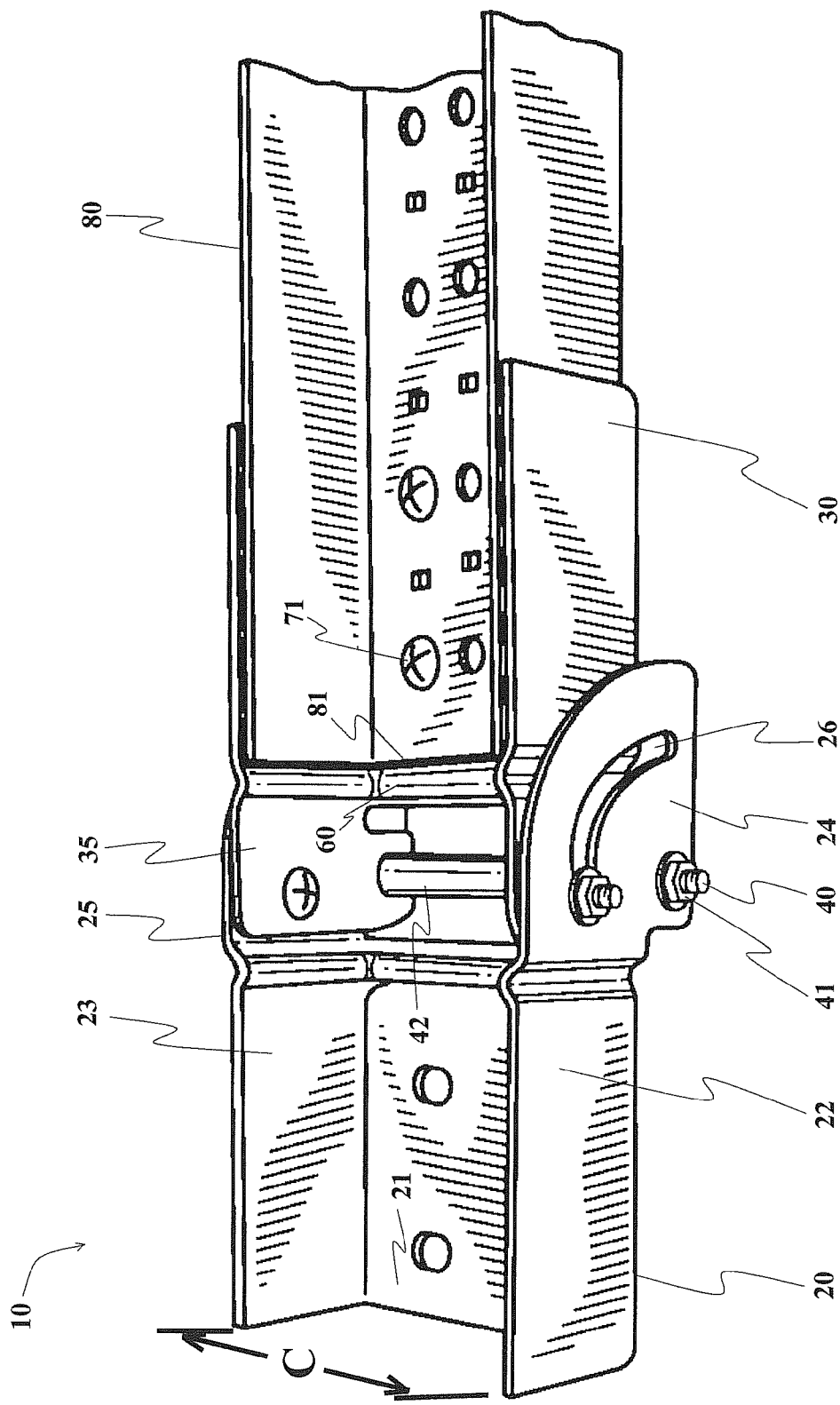
FIG. 5 is a perspective view of an adjustable cable tray joint in accordance with certain aspects of the present invention, the adjustable cable tray joint attached to a section of cable tray.

Turning to FIG. 5, an alternative embodiment is depicted. In the apparatus disclosed in FIG. 5, the pivot bolts 40 of FIGS. 1 and 2 have been replaced with pivot rod 42. Pivot rod 42 may be a solid bar, a hollow tube, a threaded member, a shouldered stud, or the like. Use of pivot rod 42 may be advantageous in certain applications, as it may provide additional support for cables, tubes, conduits, and/or wires carried within adjustable cable tray joint 10. Additionally, or alternatively, use of pivot rod 42 may provide additional structural integrity to adjustable cable tray joint 10.

FIG. 5 also depicts the receipt of cable tray 80 within second tray receptacle 30, and their attachment together by use of attachment bolts 71. As shown in FIG. 5, first and second walls 22, 23 of first tray receptacle 20 are disposed in a spaced apart configuration defining between them a width "C" of predetermined measure that is configured to receive therein a cable tray such as cable tray 80.

Figure 6:
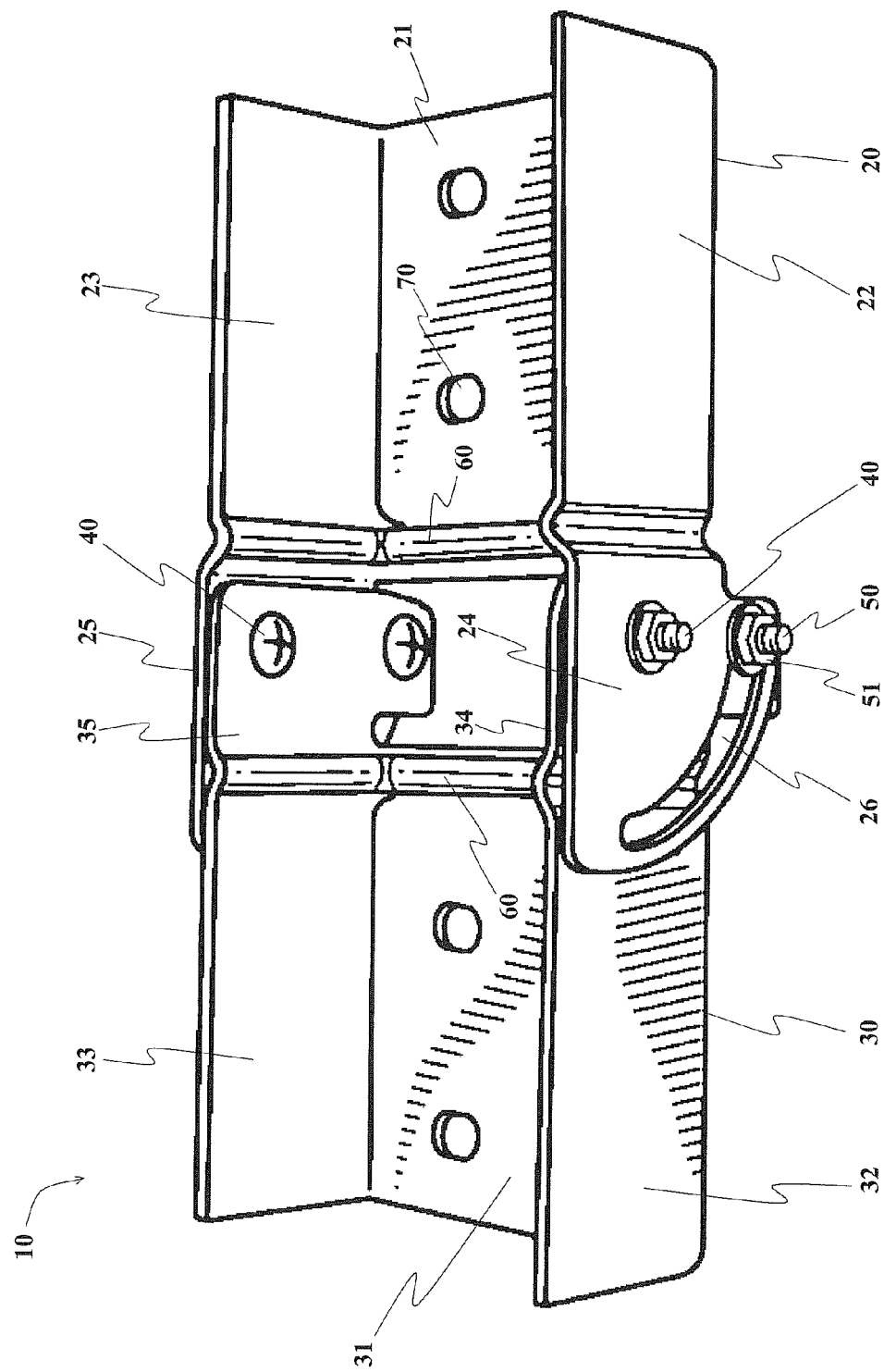
FIG. 6 is a perspective view of an adjustable cable tray joint in accordance with certain aspects of the present invention.

FIG. 6 illustrates yet another alternative embodiment with advantages for particular applications. In the apparatus depicted in FIG. 6, pivot bolts 40 have been located above the plane of first web 21. The apparatus of FIG. 6 provides for closed adjustability, but a similar configuration (not shown), in which pivot bolts 40 are located above the plane of first web 21, provides for open adjustability.

Figure 7:
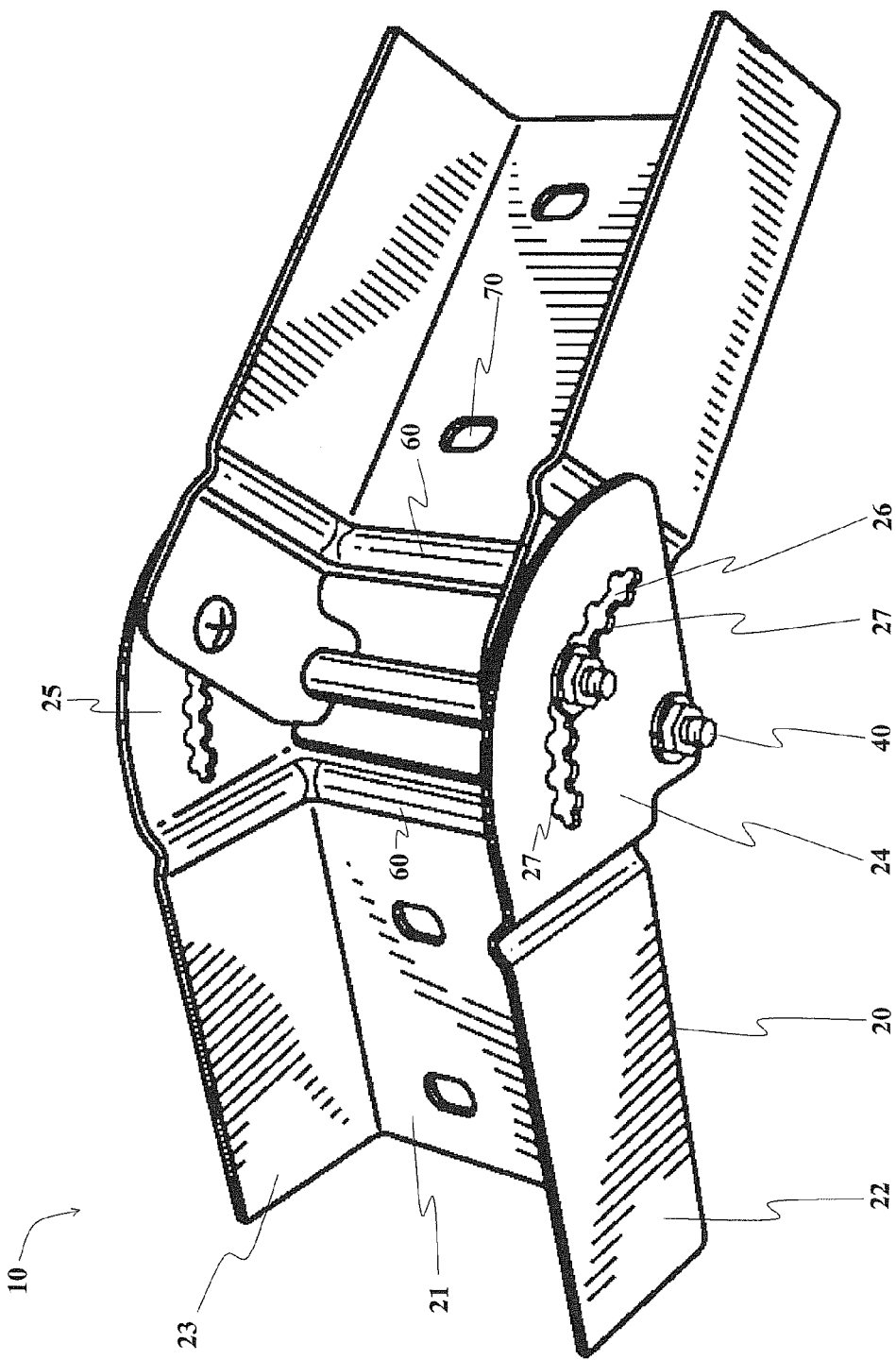
FIG. 7 is a perspective view of an adjustable cable tray joint in accordance with certain aspects of the present invention.

FIG. 7 illustrates yet still another embodiment of adjustable cable tray joint 10. As shown, aperture 26 may be configured to have indexing notches 27. By use of shouldered bolts for locking bolts 50, sized to interfit within the indexing notches, the rotation between first tray receptacle 20 and second tray receptacle 30 may be further controlled, yet such rotation still may be achieved with a range of angular relationships between first tray receptacle 20 and second tray receptacle 30.

Figure 8:
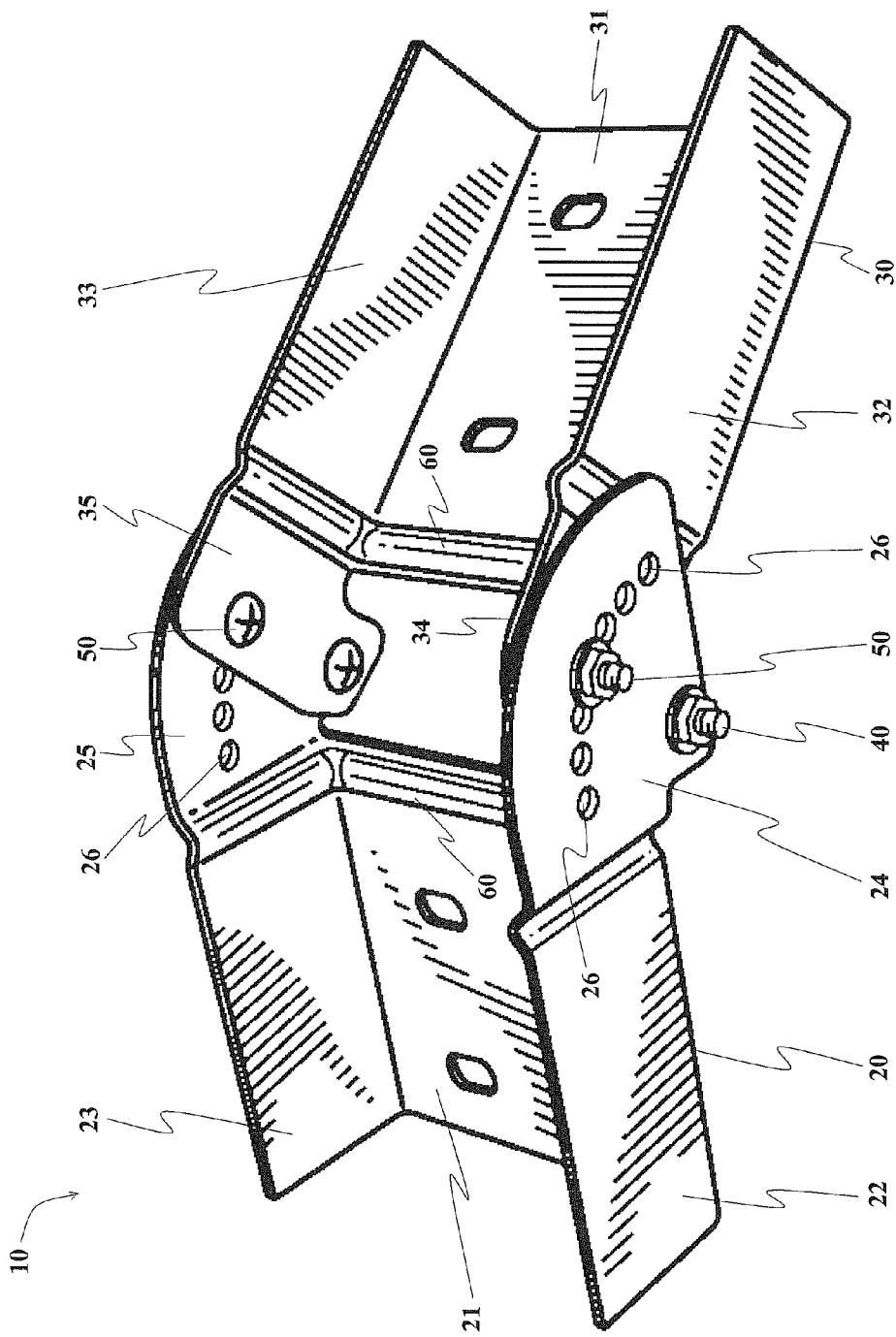
FIG. 8 is a perspective view of an adjustable cable tray joint in accordance with certain aspects of the present invention.

Alternatively, FIG. 8 depicts another embodiment of adjustable cable tray joint 10. As shown, multiple apertures 26 may be configured within first and second joint flanges 24, 25. Depending upon the particular application in which adjustable cable tray joint 10 is used, a range of angular relationships between first tray receptacle 20 and second tray receptacle 30 may be achieved.

Figure 9:
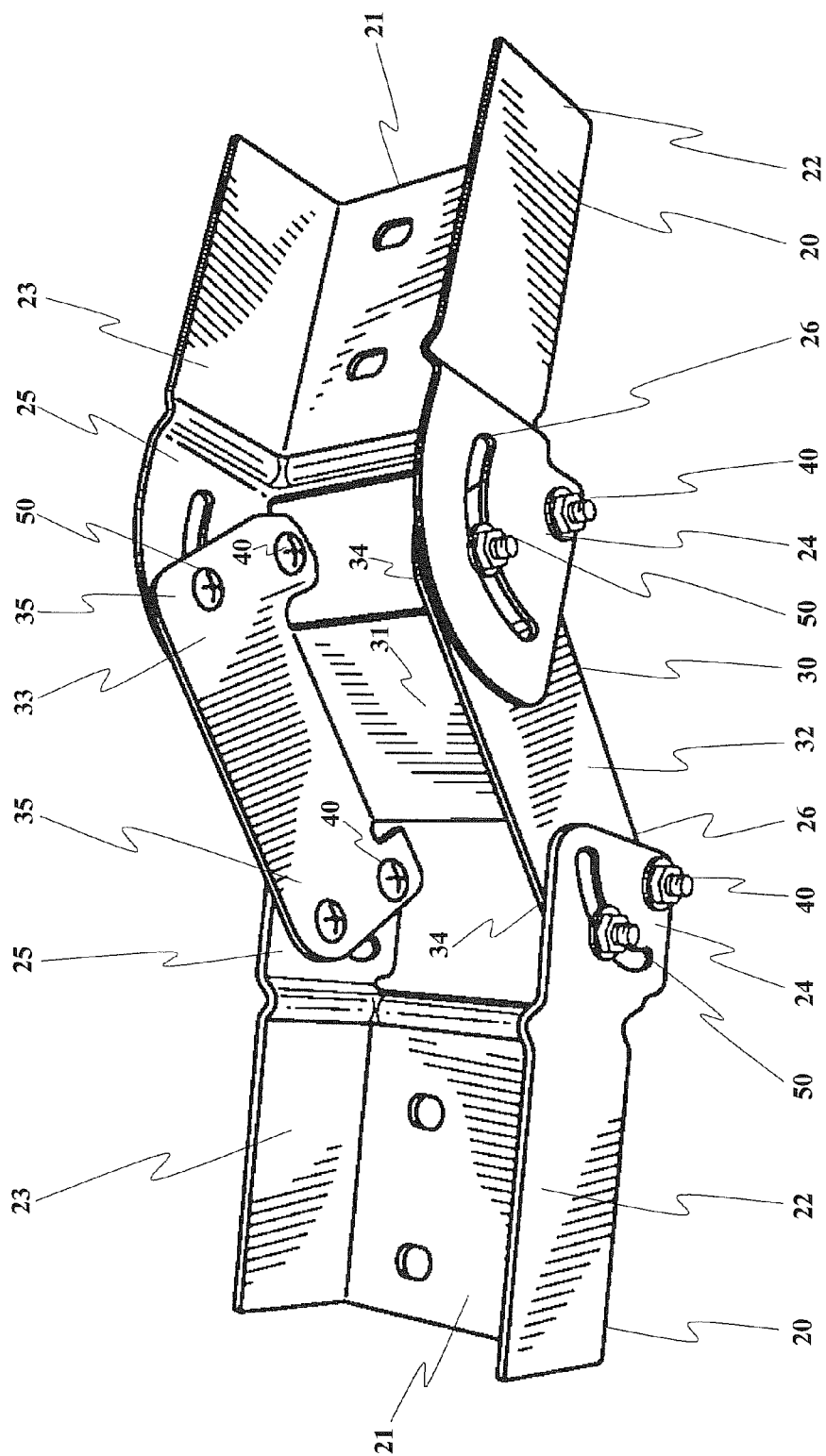
FIG. 9 is a perspective view of a combination of adjustable cable tray joints in accordance with certain aspects of the present invention.

FIG. 9 illustrates a combination in which two first tray receptacles 20 have been connected to a second tray receptacle 30 to achieve a particular result advantageous in certain situations. Specifically, by configuring a cable tray run with the combination depicted n FIG. 9, a horizontal cable tray run may still be preserved, in two parallel planes, but an obstacle in the path of one such plane (not shown) may be avoided.

Figure 10:
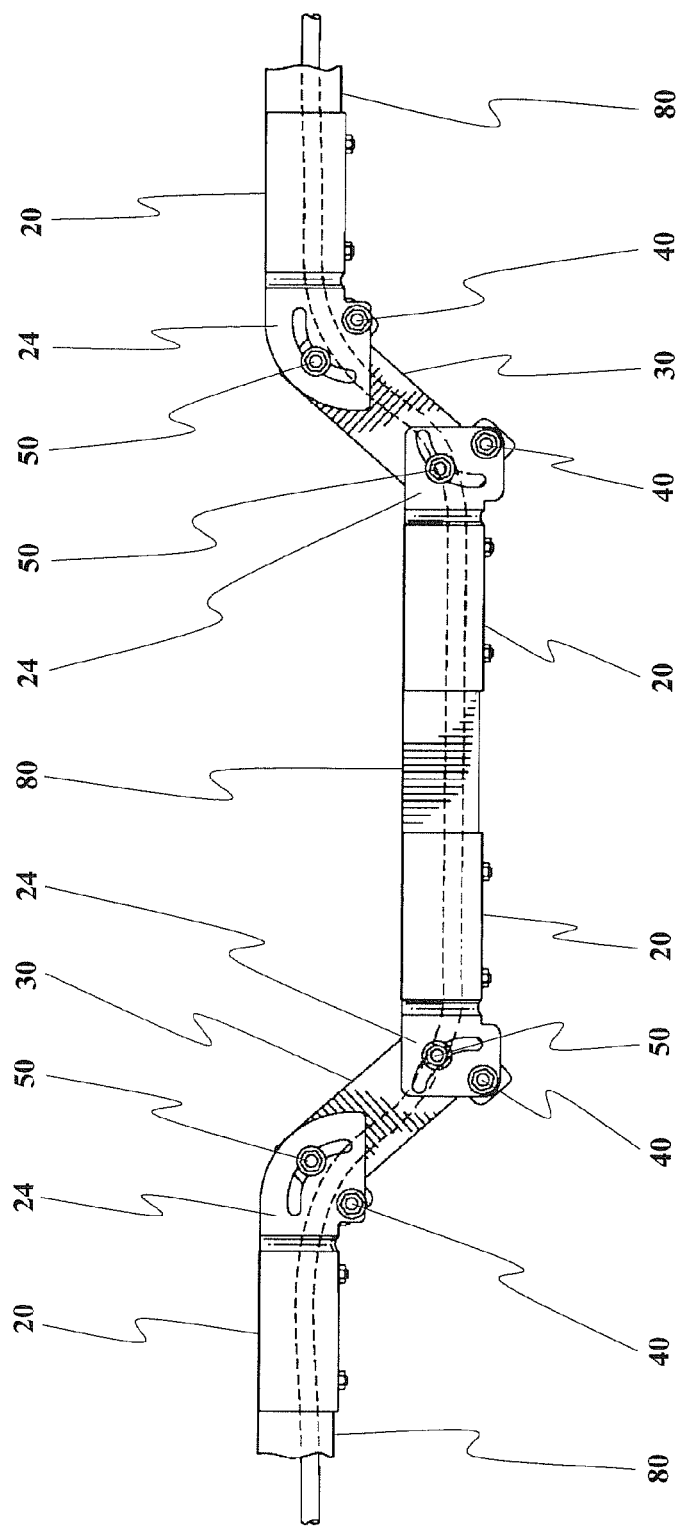
FIG. 10 is a perspective view of a combination of adjustable cable tray joints in accordance with certain aspects of the present invention.

Finally, FIG. 10 depicts another combination, in which four first tray receptacles 20 have been connected with two second tray receptacles 30 to achieve yet another particular result advantageous in certain situations. In such a configuration, an obstacle in the path of a cable tray run may be avoided, but the original plane of the cable tray run may be regained after avoidance of an interfering obstacle (not shown).

As disclosed herein, the present invention provides a cable tray joint that is adjustable to provide angular redirection of cable tray runs. While preferred embodiments of the invention have been shown and described, modifications and variations may be made thereto by those skilled in the art without departing from the spirit and scope of the present invention. Thus, it should be understood that aspects of various embodiments may be interchanged, both in whole or in part. Furthermore, those of ordinary skill in the art will appreciate that the foregoing description is by way of example only, and is not intended to be a limitation of the invention as further described in the appended claims.

The invention claimed is:

1. An adjustable cable tray joint, comprising:
   a first cable tray receptacle, said first cable tray receptacle having a first web, a first wall, and an opposing second wall;
   said first cable tray receptacle further including first and second joint flanges, said first joint flange extending from said first wall, said second joint flange extending from said second wall;
   said first joint flange defining therethrough curvilinear slot;
   a second cable tray receptacle, said second cable tray receptacle having a second web, a third wall, and an opposing fourth wall;
   said first and second cable tray receptacles attached together by pivotal connection, said first and second cable tray receptacles defining a rotation relative to each other wherein said first joint flange and third wall reside in parallel planes and said second joint flange and fourth wall reside in parallel said first joint flange disposed proximate to said third wall;

said second joint flange disposed proximate to said fourth wall; and a locking member, said locking member extending through said curvilinear slot defined in said first joint flange and through said third wall, said locking member configured to selectively fix and release said rotation.

2. The adjustable cable tray joint of claim 1, wherein said curvilinear slot defines a radius around a single point.

3. The adjustable cable tray joint of claim 1, said first cable tray receptacle further including a curb.

4. The adjustable cable tray joint of claim 3, wherein said locking member comprises a bolt and a mating nut.

5. The adjustable cable tray joint of claim 4, wherein said second joint flange defines therethrough a slot, said adjustable cable tray joint further comprising a second locking bolt and a mating nut, said second locking bolt extending through said slot and through said fourth wall, said second locking bolt configured to selectively fix and release said rotation.

6. An adjustable cable tray joint, comprising:
a first cable tray receptacle, said first cable tray receptacle having a first web, a first wall, and an opposing second wall;
said first cable tray receptacle further including first and second joint flanges, said first joint flange extending from said first wall, said second joint flange extending from said second wall;
a second cable tray receptacle, said second cable tray receptacle having a planar second web, a third wall, and an opposing fourth wall;
said first and second cable tray receptacles attached together by pivotal connection, said first and second cable tray receptacles defining a rotation relative to each other wherein said first joint flange and third wall reside in parallel planes and said second joint flange and fourth wall reside in parallel planes;
said first joint flange disposed adjacent to said third wall;
said second joint flange disposed adjacent to said fourth wall; and
locking means for selectively fixing and releasing said rotation.

7. The adjustable cable tray joint of claim 6, said first cable tray receptacle further including a curb.

8. The adjustable cable tray joint of claim 7, said second cable tray receptacle further including a curb.

9. The adjustable cable tray joint of claim 6, wherein said pivotal connection includes a rod extending between said third and fourth walls.

10. The adjustable cable tray joint of claim 6, wherein said rotation defines an arc having an angle of between about ninety degrees and about two hundred seventy degrees between said first web and said second web.

11. An adjustable cable tray joint, comprising:
a first cable tray receptacle, said first cable tray receptacle having a planar first web, a first wall, and an opposing second wall, said first and second walls being perpendicular to said first web, said first and second walls disposed in a spaced apart configuration defining therebetween a width of predetermined measure configured to receive therein a cable tray;
said first cable tray receptacle further including first and second joint flanges, said first and second joint flanges perpendicular to said first web, said first joint flange extending from said first wall, said second joint flange extending from said second wall;
said first and second joint flanges defining therethrough first and second curvilinear slots, respectively;
said first cable tray receptacle including a curb;
a second cable tray receptacle, said second cable tray receptacle having a planar second web, a third wall, and an opposing fourth wall, said third and fourth walls being perpendicular to said second web, said third and fourth walls disposed in a spaced apart configuration defining therebetween a width of predetermined measure configured to receive therein a cable tray;
said second cable tray receptacle further including third and fourth joint flanges, said third and fourth joint flanges perpendicular to said second web, said third joint flange extending from said third wall, said fourth joint flange extending from said fourth wall;
said second cable tray receptacle including a curb;
said first and second cable tray receptacles attached together by pivotal connection wherein said first and third joint flanges reside in parallel planes and said second and fourth joint flanges reside in parallel planes, said first and second cable tray receptacles defining a rotation relative to each other;
said first joint flange overlapping said third joint flange;
said second joint flange overlapping said fourth joint flange;
a first locking member, said first locking member extending through said first curvilinear slot defined in said first joint flange, and through said third joint flange, said first locking member configured to selectively fix and release said rotation; and
a second locking member, said second locking member extending through said second curvilinear slot defined in said second joint flange and through said fourth joint flange, said second locking member configured to selectively fix and release said rotation.

12. The adjustable cable tray joint of claim 11, wherein said pivotal connection includes a rod extending between said third and fourth walls. aperture, said second locking member extending through said fourth slotted aperture.

13. The adjustable cable tray joint of claim 11, wherein said rotation defines an arc having an angle of between about ninety degrees and about two hundred seventy degrees between said first web and said second web.

* * * * *